United States Patent
Barth et al.

(10) Patent No.: US 8,953,599 B1
(45) Date of Patent: Feb. 10, 2015

(54) TRAFFIC CUT-THROUGH WITHIN NETWORK DEVICE HAVING MULTIPLE VIRTUAL NETWORK DEVICES

(75) Inventors: Colby Barth, Collegeville, PA (US); Nischal Sheth, Los Altos, CA (US); Nitin Kumar, Fremont, CA (US); Xuefei Zhang, San Jose, CA (US); Panning Huang, Cupertino, CA (US); Raghavendra Mallya, San Ramon, CA (US); Bhasker R. Allam, Fremont, CA (US); Krishna Narayanaswamy, Saratoga, CA (US); Dongyi Jiang, Milpitas, CA (US); Tsai-Zong Lin, Cupertino, CA (US); Jiaxiang Su, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 221 days.

(21) Appl. No.: 13/539,120

(22) Filed: Jun. 29, 2012

(51) Int. Cl.
H04L 12/28 (2006.01)
H04L 12/751 (2013.01)

(52) U.S. Cl.
CPC .................................. *H04L 45/02* (2013.01)
USPC ........................................................ 370/390

(58) Field of Classification Search
CPC ................................................... H04L 45/02
USPC ............................. 370/395.31, 236, 253, 390
See application file for complete search history.

(56) References Cited

U.S. PATENT DOCUMENTS

| | | | |
|---|---|---|---|
| 6,976,154 B1 | 12/2005 | Dyckerhoff et al. | |
| 7,184,437 B1 | 2/2007 | Cole et al. | |
| 7,990,993 B1 | 8/2011 | Ghosh et al. | |
| 2004/0013120 A1* | 1/2004 | Shen | 370/395.31 |
| 2004/0073715 A1* | 4/2004 | Folkes et al. | 709/250 |
| 2008/0044181 A1 | 2/2008 | Sindhu | |
| 2010/0080235 A1* | 4/2010 | Yamate et al. | 370/395.31 |

* cited by examiner

*Primary Examiner* — Un C Cho
*Assistant Examiner* — Peter Mak
(74) *Attorney, Agent, or Firm* — Shumaker & Sieffert, P.A.

(57) ABSTRACT

In general, techniques are for providing a direct forwarding path between virtual routers within a single virtualized routing system. In one example, a method includes combining forwarding information from a plurality of virtual routers into collapsed forwarding information that comprises one or more direct forwarding paths between the respective virtual routers. The method also includes determining a direct forwarding path to an egress interface of the second virtual router, in response to receiving a network packet at an ingress interface of a first virtual router. The method also includes forwarding the network packet from the ingress interface of the first virtual router to the egress interface of the second virtual router using the direct forwarding path, wherein the network packet traverses a switch fabric directly from the ingress interface of the first virtual router to the egress interface of the second virtual router.

19 Claims, 5 Drawing Sheets

TRAFFIC CUT-THROUGH WITHIN NETWORK DEVICE HAVING MULTIPLE VIRTUAL NETWORK DEVICES

TECHNICAL FIELD

The disclosure relates to computer networks and, more particularly, to routing packets within computer networks.

BACKGROUND

A computer network is a collection of interconnected computing devices that may exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" may generally be defined as a path between two locations on the network. Upon receiving an incoming data packet, a router examines information within the packet, often referred to as a "key," to select an appropriate next hop to which to forward the packet in accordance with the routing information.

A variety of routers exist within the Internet. Network Service Providers (NSPs), for example, maintain "edge routers" to provide Internet access and other services to the customers. Examples of services that the NSP may provide include Voice over IP (VOIP), access for Asynchronous Transfer Mode (ATM) or frame relay communications, Internet protocol (IP) data services, and multimedia services, such as video streaming. The edge routers of the NSPs often communicate network traffic to high-speed "core routers," which may be generally viewed as forming the backbone of the Internet. These core routers often include substantially more processing resources than the edge routers, and are designed to handle high volumes of network traffic.

NSPs often desire to isolate the forwarding functions and other networks services for customers from one another for purposes of reliability and security. As a result, in some environments an NSP may implement many dedicated routers and other networking devices for each different enterprise customer. However, the complexities associated with maintenance and management of separate routers and other networking equipment may be significant.

To address these concerns, some conventional routers allow an NSP to configure and operate multiple logical software routers within the same physical routing device. These software routers are logically isolated in the sense that they achieve operational and organizational isolation within the routing device without requiring the use of additional or redundant hardware, e.g., additional hardware-based routing controllers. That is, the software routers share the hardware components of the physical routing device, such as the forwarding units and interface cards. Consequently, network providers may logically preserve conventional layers of routers within a network using virtual routers while improving physical hardware utilization. Therefore, virtual routers maintain organizational segmentation of network layers while tailoring physical capacity to the requirements of each layer.

In some cases, packets may be forwarded from one virtual router to another within the same physical system. One approach for accomplishing this is to use additional physical hardware, such as an additional physical interface, as a loopback component to forward egress packets from one virtual router to another as ingress packets. Upon receiving the loopbacked packet as an ingress packet, the receiving virtual router performs a second lookup operation to forward the packet out an egress interface of the virtual router. For instance, a physical egress interface of a first virtual router may be interconnected to a physical ingress interface of a second virtual router using a physical cable. In this way, packets are routed from the first virtual router using the network cable to the second virtual router that exists in the same physical system that hosts the first virtual router. In another example, a physical line card may be used to route network packets between interfaces of a first virtual router and a second virtual router. In either case, capital expenditures are required to purchase the physical line card and/or network cables. Moreover, internal switch fabric bandwidth may be consumed in that a network packet looped back using a physical line card or cable may be routed through the switch fabric multiple times, i.e., through a switch fabric interconnecting the first and second virtual routers to the loop back component. For instance, the first virtual router may route an inbound network packet across the switch fabric to an egress interface of the first virtual router. When the network packet is received at the ingress interface of the second virtual router, the network packet is again routed across the switch fabric to an egress interface of second virtual router. Thus, physical interconnections used to route network packets between virtual routers may result in higher capital expenditures and lower performance due to network packets traversing switch fabrics multiple times.

SUMMARY

The techniques described herein are directed to providing a direct forwarding path between virtual routers within a single virtualized routing system. Rather than using physical network cables or line cards as loopback components to route network packets between virtual routers, techniques of the present disclosure combine forwarding information of different virtual routers into collapsed forwarding information that is shared between the virtual routers. When routing packets between the otherwise logically separate virtual routers, each virtual router uses the collapsed forwarding information to select the egress interfaces of other virtual routers in the virtualized routing system. The collapsed forwarding information may include one or more logical interfaces that provide direct forwarding paths between ingress interfaces of a first virtual router and egress interfaces of a second, different virtual router. Similarly, the logical interfaces may provide direct forwarding paths between egress interfaces of the first virtual router and ingress interfaces of the second virtual router.

In accordance with techniques of the disclosure, the collapsed forwarding information may be programmed into hardware forwarding structures that are allocated to the first and second virtual routers. Using the collapsed forwarding information, the first virtual router may route packets directly from its ingress interface to an egress interface of the second virtual router. In this way, network packets may be routed directly between virtual routers without using additional physical hardware as loopback components, such as physical network cables and/or physical line cards. Moreover, the virtual routers may use the collapsed forwarding information to route network packets using the direct forwarding paths, which may reduce the number of route lookup needed to be performed on the packet as well as the number of times that the network packet traverses the switch fabric of the virtual routers. Techniques of the present disclosure may therefore provide cost and performance improvements when interconnecting virtual routers within a physical system. In some examples, the techniques may enable network providers to optimize virtual system resources, such as switch fabric bandwidth, while maintaining boundaries and multi-layer network designs.

In one example, a method includes combining forwarding information from a plurality of virtual routers into collapsed forwarding information that comprises one or more direct forwarding paths between the respective virtual routers. In the example method, the plurality of virtual routers are executed on at least one physical network device. The method also includes determining, by the first virtual router, a direct forwarding path to an egress interface of the second virtual router, in response to receiving a network packet at an ingress interface of a first virtual router. The method also includes forwarding, by the first virtual router, the network packet from the ingress interface of the first virtual router to the egress interface of the second virtual router using the direct forwarding path. In the example method, the network packet traverses a switch fabric of the at least one physical network device directly from the ingress interface of the first virtual router to the egress interface of the second virtual router.

In one example, a network device includes a control unit having one or more hardware-based microprocessors. The network device also includes a control module that combines forwarding information from a plurality of virtual routers into collapsed forwarding information that comprises one or more direct forwarding paths between the respective virtual routers. In the example network device, the plurality of virtual routers are executed on at least one physical network device. The network device also includes a forwarding unit that, in response to receiving a network packet at an ingress interface of a first virtual router, determines a direct forwarding path to an egress interface of the second virtual router. In the example network device, the forwarding unit forwards the network packet from the ingress interface of the first virtual router to the egress interface of the second virtual router using the direct forwarding path. The network packet traverses a switch fabric of the at least one physical network device directly from the ingress interface of the first virtual router to the egress interface of the second virtual router.

In one example, a non-transitory computer-readable medium includes instructions that, when executed, cause one or more processors of a network device to: combine forwarding information from a plurality of virtual routers into collapsed forwarding information that comprises one or more direct forwarding paths between the respective virtual routers. The plurality of virtual routers are executed on at least one physical network device. The non-transitory computer-readable medium also include instructions that, when executed, cause one or more processors of a network device to determine, in response to receiving a network packet at an ingress interface of a first virtual router, a direct forwarding path to an egress interface of the second virtual router. The non-transitory computer-readable medium also include instructions that, when executed, cause one or more processors of a network device to forward the network packet from the ingress interface of the first virtual router to the egress interface of the second virtual router using the direct forwarding path, wherein the network packet traverses a switch fabric of the at least one physical network device directly from the ingress interface of the first virtual router to the egress interface of the second virtual router.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
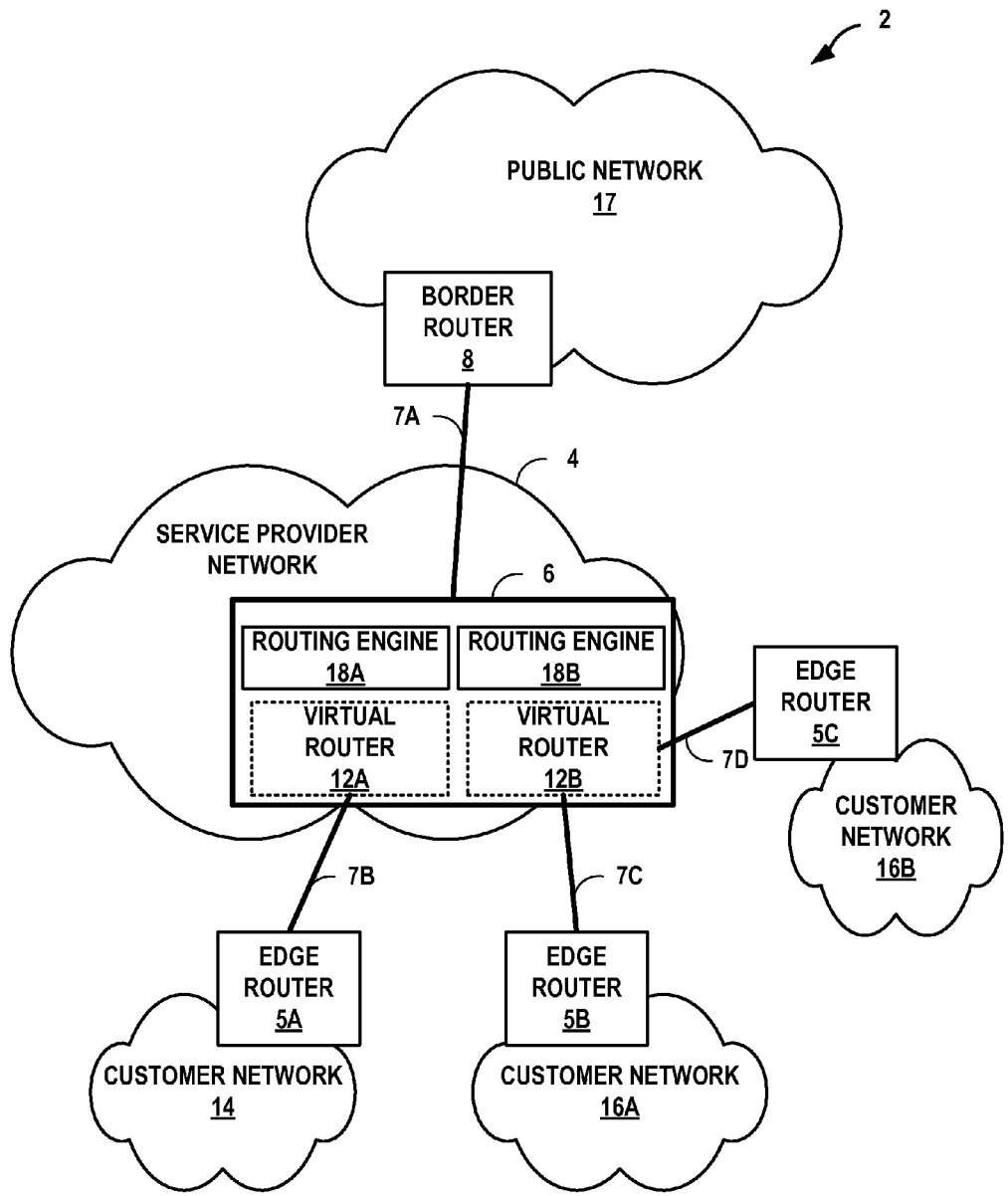
FIG. 1 is a block diagram illustrating an example network environment in which service provider network includes a multi-router system, in accordance with techniques of the present disclosure.

FIG. 1 is a block diagram illustrating an example network environment 2 in which service provider network 4 includes a multi-router system 6, in accordance with techniques of the present disclosure. In this example, multi-router system 6 includes one or more stand-alone routers that have been partitioned into multiple independent virtual routers 12A, 12B ("virtual routers 12"). Each of the virtual routers 12 operates and participates as a different standalone router within network environment 2. Each of the virtual routers 12, for example, participates in separate routing sessions with other routers to exchange routing information and maintain separate forwarding information.

For purposes of example, the principles of the disclosure are described with respect to a simplified network environment 2 of FIG. 1. In this example, virtual router 12A communicates with edge router 5A via link 7B to provide customer networks 14 access to public network 17, which may be a collection of backbone and other service provider networks. Similarly, virtual router 12B communicates with edge routers 5B, 5C via links 7C, 7D to provide customer networks 16A, 16B access to public network 17, where customer networks 16A, 16B may, for example, be geographically separate networks associated with the same enterprise. Each of virtual routers 12A, 12B may exchange routing information with customer edge routers 5 to which they are coupled in order to maintain an accurate representation of the topology of network environment 2 and the respective customer networks 14, 16. Customer networks 14, 16 may include one or more computing devices (not shown), such as personal computers, laptop computers, handheld computers, workstations, servers, switches, printers, customer data centers or other devices. The configuration of network environment 2 illustrated in FIG. 1 is merely exemplary. For example, service provider network 6 may be coupled to any number of customer networks. Nonetheless, for ease of description, only customer networks 14, 16 are illustrated in FIG. 1.

In this way, service provider network 4 may thus form part of a large-scale public network infrastructure, e.g., the Internet. Consequently, customer networks 14, 16 may be viewed as edge networks of the Internet. Service provider network 4 may provide computing devices within customer networks 14, 16 with access to the Internet and may provide other network services. Examples of services that virtual routers 12 may provide include, for example, Voice over IP (VOIP), access for Asynchronous Transfer Mode (ATM) or frame relay communications, Internet protocol (IP) data services, and multimedia distribution services, such as video streaming.

End users within customer networks 14, 16 access virtual routers 12 with computing devices or other network-enabled devices. In some cases the end users may not be associated with large enterprises but instead may access service provider network 4 via cable modems, digital subscriber line (DSL) modems or other network access devices. In another example, service provider network 4 and multi-router system 6 may provide network services within the core of the Internet and may not be directly coupled to customer networks. In either case, service provider network 6 may include a variety of network devices (not shown) other than multi-chassis router 4 and edge routers 5, such as additional routers, switches, servers, or other devices.

Although virtual routers 12 are implemented on one or more partitioned standalone routers, the virtual routers are isolated from each other in terms of routing and forwarding components yet allow network interfaces to be shared between the virtual routers. In the example of FIG. 1, virtual routers 12 share a network interface of multi-router system 6 to exchange packets with border router 8 of public network 17 via link 7A. To peer edge routers 5 and border router 8 of network environment 2, virtual routers 12 appear as separate routing devices within the topology of the network and are associated with separate network addresses. Nevertheless, as described herein, virtual routers 12 share the network interface coupled to link 7A.

Each of virtual routers 12 exclusively controls a set of interface cards assigned to its partition, each of the interface cards having one or more network interfaces (ports). In this example, virtual router 12A exclusively owns a set of interface cards having network interfaces (ports), including a network interface for communicating with edge router 5A via link 7B. Similarly, virtual router 12B exclusively owns a set of interface cards having network interfaces, including network interfaces for communicating with edge routers 5B, 5C via links 7C, 7D, respectively.

Multi-router system 6 also includes routing engines 18A and 18B. Routing engines 18A and 18B control packet routing functions, respectively, for virtual routers 12A and 12B. For example, routing protocols executing on routing engines 18A and 18B communicate with other routers within the network via routing sessions to exchange topology information and learn routing information for the network. The routing information may include route data that describes various routes through the network, and also next hop data indicating appropriate neighboring devices within the network for each of the routes. Example routing protocols include the Border Gateway Protocol (BGP), the Intermediate System to Intermediate System (ISIS) protocol, the Open Shortest Path First (OSPF) protocol, and the Routing Information Protocol (RIP). Routing engines 18A and 18B may maintain separate routing information to achieve software and hardware isolation for each of virtual routers 12, respectively. Routing engines 18A and 18B update routing information of the respective virtual routers 12 to accurately reflect the current network topology.

In this example, routing engine 18A maintains control over any packet forwarding engines and interface cards that are assigned virtual router 12A, and routing engine 18B maintains control over any packet forwarding engines and interface cards that are assigned to virtual router 12B. For example, routing engine 18A maintains exclusive control over forwarding units and interface cards that are assigned to virtual router 12A. In one embodiment, routing engine 18A independently manages control and management plane functionality for virtual router 12A. Therefore, routing engine 18A may operate as an independent, standalone router within the network for virtual routers 12A and may maintain routing information for packet forwarding units associated with virtual router 12A. Moreover, routing engines 18A and 18B generate forwarding information (e.g., forwarding tables, radix trees, etc.) based on its locally maintained routing information for each of the virtual routers and programs the forwarding information into any of packet forwarding units that are assigned to the respective virtual routers.

Techniques of the present disclosure are further described below with respect to virtual router 12A. In accordance with techniques of the present disclosure, routing engine 18A may determine a direct forwarding paths between virtual routers 12A and 12B within multi-router system 6. Thus, rather than using physical network cables or line cards as loopback components to route network packets between virtual routers, techniques of the present disclosure combine forwarding information of virtual routers 12A and 12B into collapsed forwarding information. In one example, virtual router 12A may use the collapsed forwarding information to forward network packets directly to an egress port of virtual router 12B without internal "looping" of the network packets using physical hardware, such as cable or other line cards. Reducing and/or eliminating such hardware may reduce capital expenditures. Moreover, techniques of the disclosure may require fewer hops to route the network packets from an interface of virtual router 12A to and interface of virtual router 12B (and vice versa), which may improve routing performance. The techniques are further described now with respect to FIG. 1.

Initially, routing engine 18A determines routing information for each of virtual routers 12. Furthermore, a routing information base (RIB) generated by routing engine 18A includes routing information received from other routers. Consequently, the RIB may include network routes that virtual router 12A may use to route network packets. In some examples, routing engine 18A determines an independent RIB for virtual router 12A.

Once routing engine 18A has generated a RIB for virtual router 12, routing engine 18A may generate forwarding information for virtual router 12A. Forwarding information may comprise next hop data that specifies one or more routing decisions for a particular packet. For instance, next hop data may specify neighboring network devices, ingress and/or egress interfaces, service operations to perform on network packets, etc. In some examples, routing engine 18A stores forwarding information in a forwarding information base (FIB). Next hops in a FIB may be identified based on keying information associated with a network packet.

In some examples, routing engine 18A may determine next hop data that identifies interfaces of virtual router 12A based on keying information of network packets. For example, routing engine 18A may use routing information to determine a network route for network packets received at an ingress interface of virtual router 12A based on specified keying information (e.g., source network address, destination network address, source port, destination port, protocol, etc). Using the routing information, routing engine 18A may generate next hop data that specifies, for example, an egress interface that virtual router 12A may use to forward network packets with the corresponding keying information. Routing engine 18A may determine such forwarding information that specifies forwarding decisions for virtual routers 12A. In this way, routing engine 18A may independently determine next hop data for virtual router 12A.

In accordance with techniques of the disclosure, routing engine 18A combines or "collapses" independent forwarding information of each of virtual routers 12 to generate collapsed forwarding information. For instance, routing engine 18A may initially request and receive forwarding information from routing engine 18B. Routing engine 18A may include one or more logical interfaces in the collapsed forwarding information that provide direct forwarding paths between an ingress interface of one virtual router and an egress interface of another virtual router. Using forwarding information received from routing engine 18B, routing engine 18A may determine ingress and egress interfaces of each of virtual routers 12A and 12B. Furthermore, routing engine 18A may determine network routes between virtual routers 12A and 12B. Rather than generating next hop data to route a network packet from: (1) an ingress interface of virtual router 12A, (2) to an egress interface of virtual router 12A, (3) to an ingress interface of virtual router 12B, and (4) to an egress interface of virtual router 12B, routing engine 18A may generate a logical interface comprising a direct forwarding path from the ingress interface of virtual router 12A to the egress interface of virtual router 12B.

In one example, to establish the direct forwarding path using the logical interface, routing engine 18A may use forwarding information of virtual routers 12A and 12B to generate next hop data for each of virtual routers 12 comprising a group of chained next hops where one of the hops in the chained next hops is the logical interface that provides a direct forwarding path to an egress interface of the other virtual router. In some examples, the logical interface is the first next hop in the chained next hops that are associated with the ingress interface of virtual router 12A. Routing engine 18A also generates another, subsequent next hop in the group of chained next hops that specifies the egress interface of virtual router 12B. Routing engine 18A "chains" or associates the next hop specifying the egress interface subsequent to the logical interface, such that the logical interface provides a direct forwarding path from the ingress interface of virtual router 12A to the egress interface of virtual router 12B.

In accordance with techniques of the disclosure, routing engine 18A may generate the group of chained next hops using the logical interface because routing engine 18A has the combined the forwarding information of each virtual router and therefore has knowledge of network routes between the virtual routers. Consequently, routing engine 18A may generate the chained next hops that include the logical interface to establish a direct forwarding path from the ingress interface of virtual router 12A to the egress interface of virtual router 12B. In this way, techniques of the disclosure reduce and/or eliminate the need to include next hops in the group of chained next hops for the egress interface of virtual router 12A and the ingress interface of virtual router 12B. The techniques therefore also reduce and/or eliminate the need to route the network packet across the switch fabric to the egress interface of virtual router 12A and ingress interface of virtual router 12B.

In some examples, routing engine 18A may associate one or more services with the logical interface that provides a direct forwarding path between the ingress interface of virtual router 12A and the egress interface of virtual router 12B. Examples of such services may include Virtual Private Networking (VPN), Multiprotocol Label Switching (MPLS), Quality of Service (QoS), etc. Routing engine 18A may determine that an administrator and/or automated agent have requested that a service be applied to a packet flow that will be routed from virtual router 12A to virtual router 12B en route to a final destination. Consequently, routing engine 18A, in some examples, may generate one or more egress filters that correspond to the service. In the current example, the filters may refer to a VPN service.

In accordance with techniques of the disclosure, routing engine 18A may associate the egress filter operations with the logical interface that is associated with the egress interface of virtual router 12B. That is, routing engine 18A may associate the filter operations with the logical interface such that the filter operations are applied by virtual router 12A although the packet is not forwarded to virtual router 12B using an egress interface of virtual router 12A. The filter operations are therefore applied to the network packet before the packet is forwarded across the switch fabric to the egress interface of virtual router 12B using the direct forwarding path. In this way, virtual router 12A uses the filters to provide services on a packet flow using the logical interface that provides the direct forwarding path from virtual router 12A to virtual router 12B.

While the current example describes one or more egress filters of routing engine 18A, techniques of the disclosure are also broadly applicable to ingress filters of routing engine 18B. That is, routing engine 18A may receive forwarding information from routing engine 18B and determine that one or more ingress filters are associated with one or more packet flows of routing engine 18B. By determining the ingress filters of routing engine 18B, routing engine 18A may associate the ingress filters of routing engine 18B with the logical interface. Consequently, when network packets are forwarded by virtual router 12A using a direct forwarding path across the switch fabric to the egress interface of virtual router 12B (and therefore may bypass egress filters of virtual router 12A and ingress filters of virtual router 12B), virtual router 12A may apply the filters when forwarding the network packet because the filters are associated with the logical interface.

To further illustrate techniques of the disclosure, reference is now made to routing a network packet using virtual routers 12A and 12B using the collapsed forwarding information. Initially, virtual router 12A receives a network packet at its ingress interface. Virtual router 12A performs an ingress lookup by comparing keying information of the network packet to the collapsed forwarding information that is included in the forwarding hardware assigned to virtual router 12A. Using the keying information of the network packet, a forwarding unit (e.g., packet forwarding engine) of virtual router 12A performs a lookup operation (e.g., by traversing a radix tree of forwarding information) to select a next hop for the packet, where the next hop may be a group of chained next hops that includes the logical interface that is associated with the egress interface of virtual router 12B. As previously described, the logical interface may be associated with the VPN service filters that were originally associated with the egress interface. Upon determining the group of chained next hops, the forwarding unit of virtual router 12A processes the network packet according to group of chained next hops. That is, initially virtual router 12A determines the logical interface associated with the VPN filters and the egress interface of virtual router 12B. Virtual router 12A also determines a next hop associated with the logical interface that identifies the egress interface of virtual router 12B. In some examples, virtual router 12A further applies the one or more VPN filters to the network packet. Upon determining the chained next hops and applying the filters, virtual router 12A performs one or more encapsulation rewrite operations to address the network packet to the egress interface of virtual router 12B.

Upon performing the rewrite operations, virtual router 12A forwards the network packet across the switch fabric to the egress interface of virtual router 12B. In this way, techniques of the disclosure eliminate and/reduce the need to perform an ingress lookup at virtual router 12B. Moreover, by forwarding the network packet directly to the egress interface of virtual router 12B, techniques of the disclosure may reduce and/or eliminate the need for the network packet to traverse the switch fabric from the ingress interface of virtual router 12B to the egress interface of virtual router 12B. When virtual router 12B receives the network packet, virtual router 12B forwards the network packet on to the next router in the network route via the egress interface.

Figure 2:
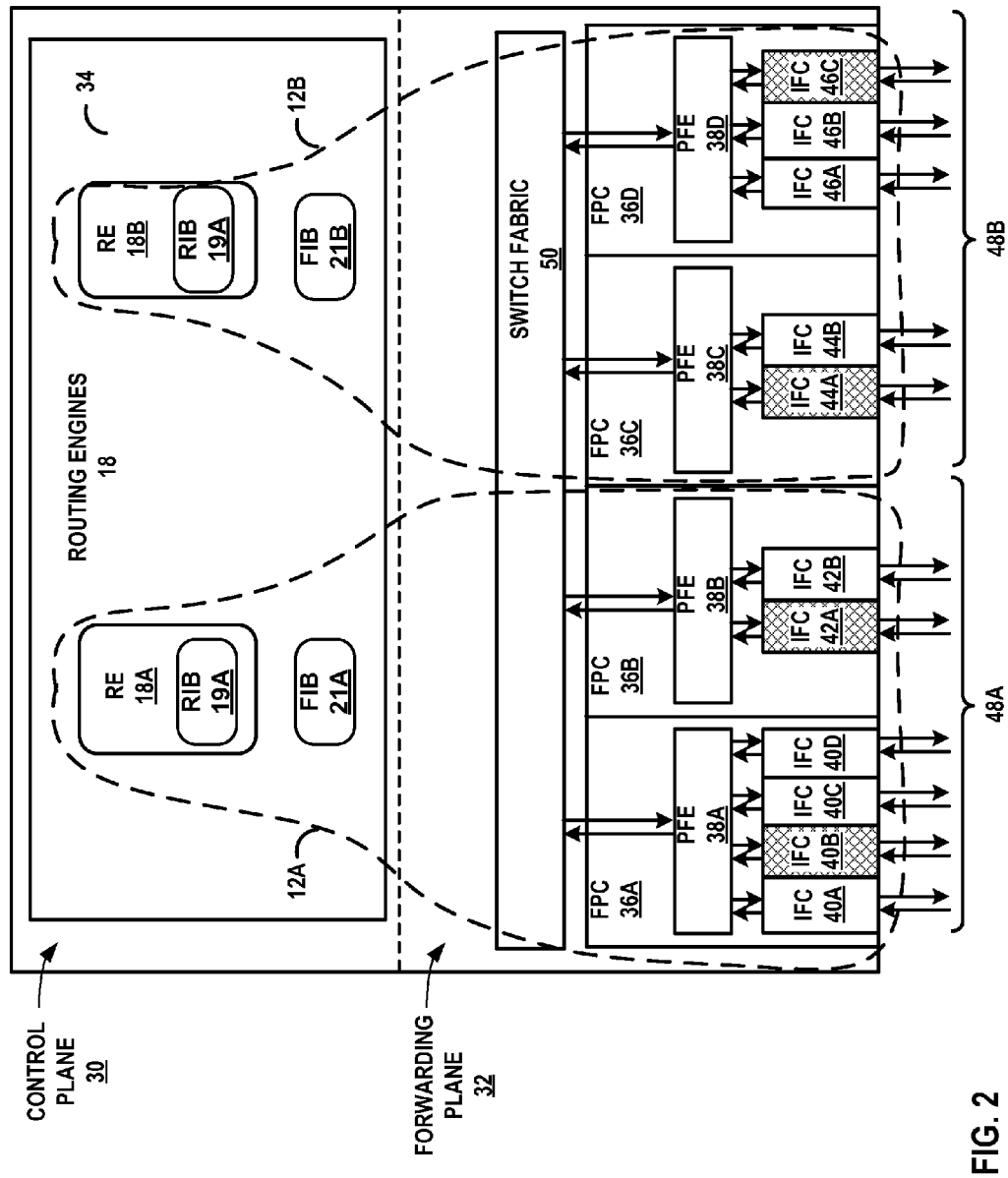
FIG. 2 is a conceptual illustration the multi-router system of FIG. 1 in further detail, in accordance with techniques of the present disclosure

FIG. 2 is a conceptual illustration the multi-router system of FIG. 1 in further detail and shows an example partitioning of multi-router system 6 into virtual router 12A and virtual router 12B, in accordance with techniques of the present disclosure. As shown in FIG. 2, multi-router system 6 includes hardware components comprising a control system 34, switch fabric 50, and flexible packet interface card concentrators (FPCs) 36A1-36A4. The functionality of multi-router system 6 may be logically divided into control plan 30 and forwarding plane 32. In some examples, components of control plane 30, such as control system 34 and routing engines 18A-18B, determine routing information about network routes from other routers operatively coupled to multi-router system 6. Control plane 30 also generates forwarding information to route network packets based on the routing information. Control plane 30 may configure components of forwarding plane 32 to forward network packets in accordance with the forwarding information.

Components of forwarding plane 32 may be configured in accordance with the forwarding information to process network packets. That is, as network packets are received by components of forwarding plane 32, the network packets are processed based on the forwarding information and subsequently forwarded, dropped, etc. In this way, forwarding plane 32 is responsible for routing packets from one router to another.

As shown in FIG. 2, multi-router system 6 includes a control system 34 that provides on operating environment for routing engines 18A-18B. Control system 34 may include a processor-based operating environment for an operating system and software processes, such as routing processes, chassis configuration process, and other processes for implementing the control plane of a router. In the example of FIG. 2, control system 34 includes one or more high-speed communications channels. The communication channels could be hardware and/or a combination of hardware and software that enable routing engines 18A and 18B to communicate with each other and other components multi-router system 6.

Virtual routers 12A and 12B are each associated, respectively, with routing engines 18A and 18B that provides full control-plane operations. In this example, each of virtual routers 12 may each be configured with a set of flexible packet interface card concentrators (FPCs) 36A-36D (collectively "36A-36D"), each of which may include a packet forwarding engine (PFE) and a set of one or more individual interface cards (IFCs) 40A-40D, 42A-42B, 44A-44B, and 46A-46C for inbound and outbound network communication via network links 48A and 48B. Multi-router system 6 also contains electronics for implementing an internal switch fabric 50 that provides a switching mechanism between the packet forwarding engines of the FPCs internal to multi-router system 6. For example, multi-router system 6 includes an internal switch fabric 50 as a switching mechanism between interface cards of FPCs 36. According to techniques of the present disclosure, transit network packets may be directly and internally forwarded between virtual routers 12A and 12B using direct forwarding paths as described in FIG. 1 and in the examples below. Switch fabric 50 may be implemented as a multi-stage switch fabric or as a full-mesh, single-stage switch fabric. U.S. Patent Application 2008/0044181, entitled MULTI-CHASSIS ROUTER WITH MULTI-PLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

In the example of FIG. 2, virtual router 12A includes four flexible packet interface card concentrators (FPCs) 36A-36B. Virtual router 12A is formed by assigning FPCs 36A-36B to routing engine 18A. In this way, virtual router 12A has ownership of FPC 36A, its packet forwarding engine (PFE) 38A and its interface cards IFCs 40A-40D. In addition, virtual router 12A has logical ownership of FPC 36B, PFE 38B, interface cards IFCs 42A-42B. Similarly, virtual router 12B is formed by assigning FPCs 36C and 36D to virtual router 12B. Virtual router 12B has ownership of FPCs 36C, 36D, their PFEs 38C-38D, IFCs 44A-44B, and IFCs 46A-46C.

Referring now to control plane 30, routing engines 18A and 18B may control packet routing functions for virtual routers 12A and 12B. For example, routing protocols executing on routing engines 18A and 18B communicate with other routers within the network via routing sessions to exchange topology information and learn routing information for the network. The routing information may include route data that describes various routes through the network, and also next hop data indicating appropriate neighboring devices within the network for each of the routes. Routing engines 18A and 18B may maintain, respectively, separate routing information in the form of logically separate routing information bases (RIBs) 19A, 19B to achieve software and hardware isolation for each of virtual routers 12. Routing engine 18A, for example, updates routing information of virtual router 12A to accurately reflect the current network topology.

Routing engines 18A and 18B also use the routing information to derive forwarding information bases (FIBs) 21A and 21B for the respective virtual routers to which the routing engine is assigned. Each of routing engines 18A and 18B may install FIBs 21A and 21B in each of FPCs 36 that are logically assigned to its respective virtual router. In this way, each of FPCs 36 includes forwarding state for the virtual router to which it is assigned. Thus, a FIB for one of FPCs 36 allocated to virtual router 12A may be the same or different than a FIB for a different one of the FPCs allocated to virtual router 12B. Routing engines 18A and 18B may communicate with FPCs 36 via inter-process communications (IPCs) or other communication techniques using wired or wireless communication hardware.

Routing engine 18A and 18B may generate FIBs 21A and 21B in the form of one or more radix trees, respectively, having leaf nodes that represent destinations within the network. U.S. Pat. No. 7,184,437 provides details on an exemplary embodiment of a router that utilizes a radix tree for route resolution, the contents of which is incorporated herein by reference in its entirety. Further exemplary details of generating forwarding information including chain next hops are described in issued U.S. Pat. No. 7,990,993, the entire contents of which are incorporated herein by reference.

Techniques of the present disclosure are now described in an example of virtual router 12A forwarding a network packet virtual router 12B using a direct forwarding path. Initially, routing engine 18A and 18B determine routing information for one or more routers operably coupled to multi-router system 6. Consequently, routing engine 18A determines one or more network routes for network packets received at virtual router 12A and stores the network routes in a RIB for virtual router 12A. Similarly, routing engine 18B also determines one or more network routes for network packets received at virtual router 12B and stores the network routes in a RIB for virtual router 12A. Using the routing information stored in RIB 19A of virtual router 12A, routing engine 18A generates forwarding information to forward network packets received at virtual router 12A. Similarly, routing engine 18B generates forwarding information to forward network packets received at virtual router 12B.

In accordance with techniques of the present disclosure, routing engine 18A requests or otherwise accesses the forwarding information generated by routing engine 18B based on RIB 19B. In some examples, the forwarding information may comprise forwarding tables. Using the forwarding information, routing engine 18A determines interfaces of virtual routers 12A and 12B. For example, routing engine 18A uses the forwarding information to determine that virtual router 12B includes interfaces 44A-44B and interfaces 46A-46C. In some examples, routing engine 18A further determines whether each interface is an ingress interface or an egress interface. In the example of FIG. 2, routing engine 18A determines that interface 44A is an ingress interface and interface 46C is an egress interface. Routing engine 18A may also determine that interface 40B is an ingress interface and interface 42A is an egress interface.

In accordance with techniques of the disclosure, routing engine 18A combines or "collapse" independent forwarding information of each of virtual routers 12 to generate collapsed forwarding information. For instance, routing engine 18A determines a network route between virtual routers 12A and 12B. Rather than generating next hop data to route a network packet from: (1) ingress interface 40B of virtual router 12A, (2) to egress interface 42A of virtual router 12A, (3) to ingress interface 44A of virtual router 12B, and (4) to egress interface 46C of virtual router 12B, routing engine 18A generates next hop data that comprises a direct forwarding path from ingress interface 40B of virtual router 12A to egress interface 46C of virtual router 12B by was on an intermediate logical interface.

In accordance with techniques of the disclosure, routing engine 18A associates the logical interface with egress interface 46C in the collapsed forwarding information. To associate the logical interface with egress interface 46C, routing engine 18A generates next hop data comprising a group of chained next hops. The group of chained next hops includes a next hop for the logical interface and a next hop for the egress interface chained subsequent to the next hop of the logical interface.

In the example of FIG. 2, routing engine 18A may generate the group of chained next hops using the logical interface because routing engine 18A has the combined forwarding information of each of virtual routers 12 and therefore has knowledge of network routes between the virtual routers. Consequently, routing engine 18A may generate the chained next hops that include the logical interface to establish a direct forwarding path from ingress interface 40B of virtual router 12A to egress interface 42A of virtual router 12B. Routing engine 18A further configures the collapsed forwarding information such that chained next hops are associated with keying information of network packets routed from virtual router 12A to virtual router 12B.

As described in FIG. 1, routing engine 18A may generate one or more additional next hops that are chained to the next hop identifying the logical interface. The additional next hops may specify one or more services that are applied to network packets routed from virtual router 12A to virtual router 12B.

Once routing engine 18A has generated the collapsed forwarding information with the direct forwarding path from ingress interface 40B to egress interface 46C, routing engine 18A sends the collapsed forwarding information to FPC 36A. PFE 38 receives the forwarding information and configures its hardware forwarding structures (further described in FIG. 3) according to the collapsed forwarding information. When virtual router 12A receives a network packet at ingress interface 40B, PFE 38A determines the keying information associated with the network packet. Using the keying information, PFE 38A performs an ingress lookup by comparing the keying information to the collapsed forwarding information configured in the hardware lookup structures of PFE 38.

Upon determining the group of chained next hops that provide the direct forwarding path from ingress interface 40B to egress interface 46C, PFE 38A processes the network packet according to the group of chained next hops. For example, PFE 38A initially determines during the ingress lookup, the next hop corresponding to the logical interface that is associated with egress interface 46C. Upon determining the logical interface, PFE 38A may, in some examples, apply one or more services to the network packet that are associated with the logical interface. PFE 38A subsequently determines the next hop that corresponds to egress interface 46C. PFE 38A may perform one or more encapsulation rewrite operations to address the network packet to egress interface 46C of virtual router 12B. In some examples, the encapsulation rewrite operation may apply a header to the network packet that identifies egress interface 46C.

PFE 38A forwards the network packet across switch fabric 50 to PFE 38D. In this way, techniques of the disclosure eliminate and/or reduce the need to perform an ingress lookup at ingress interface 44A if, for example, a loopback cable alternatively connected egress interface 42A to ingress interface 44A. Moreover, by forwarding the network packet directly across switch fabric 50 to egress interface 46C, techniques of the disclosure may reduce and/or eliminate the need for the network packet to traverse the switch fabric from ingress interface 40B to egress interface 46C. When PFE 38D receives the network packet, PFE 38D directly forwards the network packet to the next router in the network route via egress interface 46C.

In some examples, techniques of the present disclosure provide for a full mesh of direct forwarding paths between ingress interfaces of one virtual router and egress interfaces of another virtual router. In some examples, one or more of the direct forwarding paths may be unidirectional, or bidirectional in that network packets may traverse in either direction between the network interfaces. In still other examples, techniques of the disclosure may provide for a single direct forwarding path between, for example, two PFEs. Again, in some examples, one or more of the direct forwarding paths may be bidirectional or unidirectional.

Figure 3:
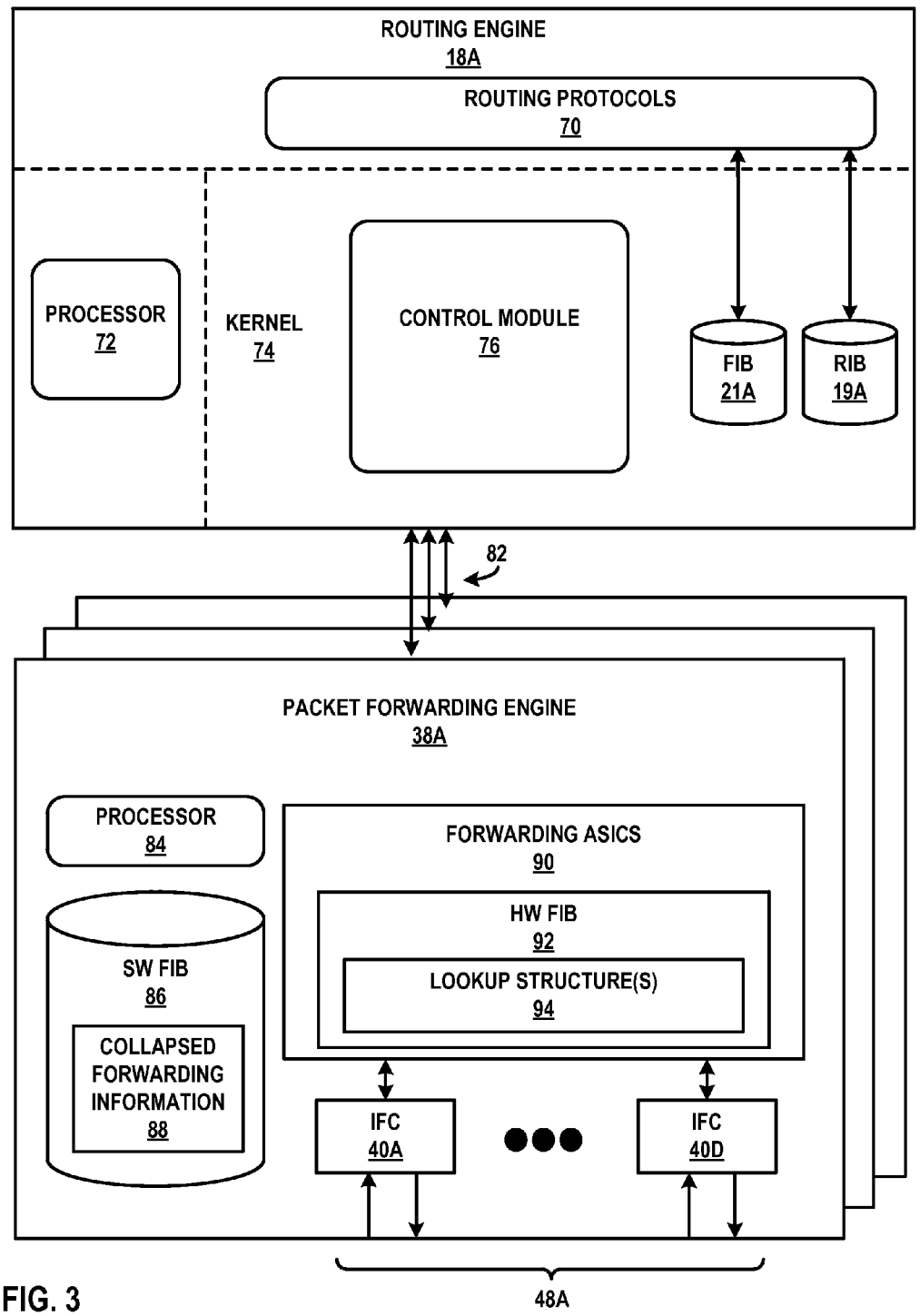
FIG. 3 is a block diagram illustrating in further detail a routing engine and packet-forwarding engine of a virtual router as shown in FIG. 2, in accordance with techniques of the present disclosure.

FIG. 3 is a block diagram illustrating in further detail routing engine 18A and packet-forwarding engine 38A of virtual router 12A as shown in FIG. 2, in accordance with techniques of the present disclosure. Routing engine 18A may include various routing protocols 70, such as Multiprotocol Label Switching (MPLS), Resource Reservation Protocol (RSVP), Border Gateway Protocol (BGP), etc. Routing protocols 70 interact with kernel 74 (e.g., by way of API calls) to update routing information base (RIB) 19A based on routing protocol messages received by routing engine 18A. For instance, kernel 74, executing at processor 72, generates forwarding information in the form of forwarding information base (FIB) 21A based on the network topology represented in RIB 19A. Kernel 74 may determine the physical interface allocated to virtual router 12A to be used for forwarding next hops that are included in the forwarding information. Kernel 74 then programs PFE 38A to install copies of the FIB 21A as software FIBs 86 of PFEs 8. Processor 72, in some examples, includes a CPU and/or memory and may provide processing resources for one or more components including kernel 74, control module 76, FIB 21A, RIB 19A, etc.

Control module 76, in the example of FIG. 3, implements one or more techniques of the present disclosure to establish direct forwarding paths between virtual routers 12A and 12B. In some examples, control module 76 generates collapsed forwarding information in accordance with techniques of the disclosure. Control module 30 is further described below in the example of FIG. 3.

FIG. 3 also depicts example embodiments for PFE 38A in further detail. In some examples, PFE 38A includes a processor 84, software forwarding information base (FIB) 86, forwarding Application-Specific Integrated Circuit (ASICS) 90, and physical interfaces 40A-40D ("IFCs 10"). Processor 84, in some examples, includes a CPU and/or memory and may provide processing resources for one or more components of PFEs 38A including software FIB 86, and forwarding ASICS 90. Processor 84 may execute a microkernel to provide an operating environment for one or more interfaces between components.

As shown in FIG. 3, FIB 92 includes one or more lookup structures 94. Lookup structures 94 may include associations between network prefixes, network routes, next hops, etc. For instance, an example of a lookup structure may include a radix tree. The radix tree may include hierarchically arranged nodes that correspond to keying information of a network packet, such as a network address, interface identifier, etc. In some examples, a leaf node of the radix tree is associated with a next hop, group of chained next hops, interface identifier, etc. Consequently, when PFE 38A receives a network packet, PFE 38A may use keying information (e.g., source network address, destination network address, protocol, source interface, destination) associated with the network packet to traverse the radix tree and select a next hop that corresponds to the keying information. PFE 38A may then process the network packet in accordance with the next hop.

In another example, one of lookup structures 94 may include a table. The table may include one or more associations between logical interface identifiers, network addresses, interface identifiers, and next hops. In one example, a table may include associations between logical interface identifiers and next hops. Consequently, if PFE 38A processes a network packet and determines a logical interface identifier that corresponds to the keying information of the network packet, PFE 38A may determine a next hop associated with the logical interface identifier using the table. Although lookup structures 94 have been described with respect to radix trees and tables, lookup structures 94 may include any suitable data structures usable to process network packets in PFE 38A.

As shown in FIG. 2, PFE 38A includes ASICS 90. ASICs 90 are microcode-controlled chipsets that are programmably configurable by processor 84. Specifically, one or more of ASICs 90 are controllable by microcode programmed by processor 84. One example of a network device including a packet processing engine having multiple microcode instruction memories is described in U.S. Pat. No. 6,976,154, the entire contents of which are incorporated herein by reference. Processor 84 programs a hardware FIB 92 into internal memory of ASICs 90 based on software FIB 86. For example, processor 84 may program collapsed forwarding information of software FIB 86 into hardware FIB 92 as lookup structures 94. Consequently, forwarding ASICs 90 processes network packets based on lookup structures 94.

Reference is now made to FIG. 3 to illustrate techniques of the present disclosure for establishing one or more direct forwarding paths from virtual router 12A to virtual router 12B. Initially, routing engine 18A uses routing protocols 70 to determine network route for network packets received at PFE 38A. For instance, routing engine 18A may use BGP to determine network routes from virtual router 12A to other routers that are operatively coupled to virtual router 12A. Upon determining the network routes, routing engine 18A stores the routes in RIB 19A as routing information. Using the routing information of RIB 19A, routing engine 18A generates forwarding information to forward network packets received at virtual router 12A.

In one example, control module 76 requests or otherwise accesses forwarding information (FIB 21B) from routing engine 18B. Based on the forwarding information received from routing engine 18B, control module 76 determines interfaces of virtual routers 12A and 12B. For instance, control module 76 may determine that virtual router 12A includes interfaces 40A-40D and interfaces 42A-42D. Additionally, control module 76 may use the forwarding information from virtual router 12B to determine that virtual router 12B includes interfaces 44A-44B and 46A-46C.

As described in FIG. 2, control module 30 determines whether each interface of virtual routers 12A and 12B is an ingress interface or an egress interface. In the example of FIG. 3, control module 76 determines that interface 40B is an ingress interface and interface 46C of virtual router 12B is an egress interface.

To establish direct forwarding paths between virtual routers 12A and 12B, control module 76 combines the forwarding information (FIBs 21A, 21B), or portions thereof, from each of virtual routers 12 to generate collapsed forwarding information. The collapsed forwarding information specifies one or more operations that, for example, PFE 38A uses the collapsed forwarding information to forward network packets from PFE 38A to one or more other network devices (e.g., routers, switches, etc) en route to a final destination device of the network packet. Consequently, the collapsed forwarding information may specify next hops comprising operations to route network packets using direct forwarding paths to other virtual routers, in accordance with techniques of the disclosure. The collapsed forwarding information may also specify next hops comprising operations to route network packets to other network devices using conventional techniques. In this way, the collapsed forwarding information may specify, in some examples, both next hops comprising operations for direct forwarding paths to other virtual routers and next hops for conventionally routing network packets to other routers operatively coupled to virtual router 12A.

Using the forwarding information of each of the virtual routers, control module 76 determines that virtual router 12B is included as a network device in a network route from virtual router 12A to a final destination device. In response to determining that virtual router 12B is included in the network route, control module 76 may use the forwarding information from virtual router 12B to determine an egress interface (e.g., egress interface 46C as shown in FIG. 2) of virtual router 12B that is used forward network packets to the final destination device.

Upon determining the egress interface of virtual router 12B, control module 76 may generate a direct forwarding path between ingress interface 40B and egress interface 46C. In accordance with techniques of the disclosure, control module 76 associates the logical interface with egress interface 46C in the collapsed forwarding information. To associate the logical interface with egress interface 46C, control module 76 generates next hop data comprising a group of chained next hops. The group of chained next hops includes a next hop for the logical interface and a next hop for the egress interface chained subsequent to the next hop of the logical interface.

Control module 76 may generate the group of chained next hops using the logical interface because control module 76 has the combined forwarding information of each of virtual routers 12 and therefore has knowledge of network routes between the virtual routers. Consequently, routing engine 18A may generate, in the collapsed forwarding information, the chained next hops that include the logical interface to establish a direct forwarding path from ingress interface 40B of virtual router 12A to egress interface 46C of virtual router 12B. Control module 76 further configures the collapsed forwarding information such that chained next hops are associated with keying information of network packets routed from virtual router 12A to virtual router 12B.

Once control module 76 has generated the collapsed forwarding information, control module 76 sends the collapsed forwarding information to PFE 38A via one or more communication channels 82. Communication channels 82 may be one or more wired or wireless couplings between routing engine 18A and PFE 38A. As shown in FIG. 3, processor 84 causes collapsed forwarding information 88 to be stored in software FIB 86.

As shown in FIG. 3, PFE 38A uses collapsed forwarding information 88 to configure lookup structures 94 included in hardware FIB 92. Lookup structures 94 may include one or more radix trees, tables, etc., that specify next hops used to process network packets received at PFE 38A. For instance, lookup structures 94 may include the group of chained next hops that specify the direct forwarding path between virtual router 12A to virtual router 12B.

When a network packet is received at ingress interface 40B, forwarding ASICs 90 determine keying information included in the packet header of the network packet. Forwarding ASICs 90 use the keying information to perform an ingress lookup to determine one or more next hops that correspond to the keying information. In the example of FIG. 3, the keying information is associated with a group of chained next hops that specify the direct forwarding path between virtual router 12A and virtual router 12B. Consequently, forwarding ASICs 90, upon performing the ingress lookup, determine that the logical interface is the next hop. If one or more filters are associated with the logical interface next hop, forwarding ASICs 90 process the network packet according to the filters.

Forwarding ASICs 90 may further determine that a next hop in the group of chained next hops identifies egress interface 46C of virtual router 12B. Consequently, forwarding ASICs 90 may apply header information to the network packet that specifies PFE 38D, which includes egress interface 46C. Forwarding ASICs 90 may also apply header information to the network packet that specifies egress interface 46C. Upon applying the header information, PFE 38A forwards the network packet to PFE 38D using switch fabric 50. Upon receiving the network packet, PFE 38D determines that header information of the network packet specifies egress interface 46C. Using the header information PFE 38D may forward the network packet to another router using egress interface 46C.

Figure 4:
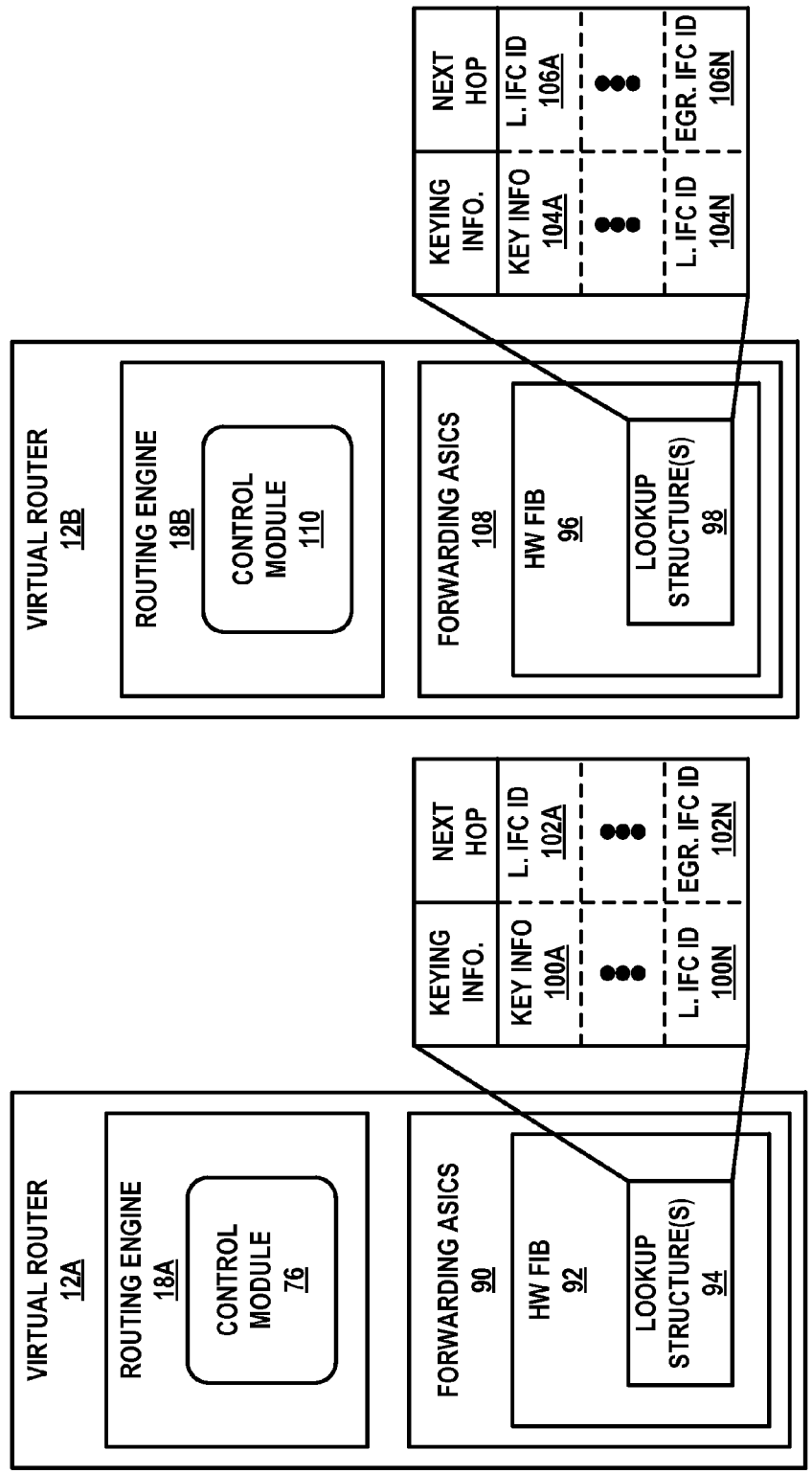
FIG. 4 is a conceptual drawing of lookup structures that illustrate direct forwarding paths between virtual routers, in accordance with techniques of the disclosure.

FIG. 4 is a conceptual drawing of lookup structures 94 that illustrate direct forwarding paths between virtual routers 12A and 12B, in accordance with techniques of the disclosure. FIG. 4 illustrates hardware FIB 92, lookup structures 94, routing engine 18A, and control module 76, as previously described in FIG. 3. FIG. 4 also illustrates virtual router 12B that further includes routing engine 18B and control module 110 a hardware FIB 96. Control module 110 may operate in the same or similar fashion to control module 76 as described in FIG. 3. Hardware FIB 96 may operate in the same or a similar fashion to hardware FIB 92 as previously described in FIG. 3. Hardware FIB 96 also includes lookup structures 98. Lookup structures 98 also store and/or structure data of lookup structures 98 in a similar fashion to lookup structures 94 as previously described in FIG. 3.

Although lookup structures 94 and 98 are illustrated as tables in FIG. 4, the data may but structured in any suitable way, such as a radix tree, array, linked list, etc. Lookup structures 94, 98 include associations between keying information and next hops that forwarding ASICs 90, 96 use to respectively process network packets. Control module 76, in some examples, may send one or more control messages to routing engine 18B to request forwarding information of routing engine 18B. Control module 110, in response to the one or more control messages, may select its forwarding information and send such forwarding information to routing engine 18A, which in turn may be processed by control module 76 in accordance with techniques of the disclosure.

As described in FIG. 3, to establish direct forwarding paths between virtual routers 12A and 12B, control module 76, for example combines the forwarding information from each of virtual routers 12A, 12B to generate collapsed forwarding information. Virtual router 12A, for example, uses information of each of the virtual routers to determine that virtual router 12B is included as a network device in a network route from virtual router 12A to a final destination device.

In response to determining that virtual router 12B is included in the network route, control module 76 may use the forwarding information from virtual router 12B to determine an egress interface (e.g., egress interface 46C as shown in FIG. 2) of virtual router 12B that is used forward network packets to the final destination device. Control module 76 may determine that egress interface identifier 102N identifies egress interface 46C of virtual router 12B.

Upon determining egress interface identifier 102N, control module 76 may establish a direct forwarding path between ingress interface 40B and egress interface 46C. In accordance with techniques of the disclosure, control module 76 generates a logical interface that is identified by logical interface identifier 102A. Control module 76 associates the logical interface with keying information 100A of network packets that use a network route that includes virtual router 12B. Furthermore, control module 76 associates the logical interface with keying information 100A in the collapsed forwarding information. To associate the logical interface with keying information 100A and egress interface 46C, control module 76 generates next hop data comprising a group of chained next hops. The group of chained next hops includes a next hop for the logical interface and a next hop for the egress interface chained subsequent to the next hop of the logical interface.

As shown in FIG. 4, keying information 199A is included in lookup structures 94. Control module 76 may associate keying information 100A with a next hop that comprises logical interface identifier 102A. In this way, when forwarding ASICs 90 performs an ingress lookup on a network packet that destined on a network route that includes virtual router 12B, forwarding ASICs 90 determine that the next hop is the logical interface identified by logical interface identifier 102A.

Control module 76 also associates logical interface identifier 100N as keying information with a next hop that comprises egress interface identifier 102N. Consequently, when forwarding ASICs 90 processes a network packet in accordance with a group of chained next hops that includes logical interface identifier 102A and egress interface identifier 102N, forwarding ASICs 90 may determine logical interface identifier 102A and a next hop comprising egress interface identifier 102N that is chained to logical interface identifier 102A. In some examples control module 76 may associate one or more operations of services to be applied to network packets with the logical interface. Such services may be associated with a next hop identifying logical interface identifier 102A and egress interface identifier 102N. As shown by lookup structures 94, control module 76 may generate chained next hops that include logical interface identifier 102A to establish a direct forwarding path from ingress interface 40B of virtual router 12A to egress interface 46C of virtual router 12B.

When a network packet is received at ingress interface 40B, forwarding ASICs 90 determine keying information 100A included in the packet header of the network packet. Forwarding ASICs 90 use keying information 100A to perform an ingress lookup to determine one or more next hops that correspond to the keying information. In the example of FIG. 4, keying information 100A is associated with a group of chained next hops that specify the direct forwarding path between virtual router 12A and virtual router 12B. Consequently, forwarding ASICs 90, upon performing the ingress lookup, determine that a next hop comprising logical interface identifier 102A is the next hop. If one or more filters are associated with the logical interface next hop, forwarding ASICs 90 process the network packet according to the filters.

Forwarding ASICs 90 may further determine that a next hop in the group of chained next hops identifies comprises egress interface identifier 102N. That is, logical interface identifier 102A may be keying information to identify egress interface identifier 102N as the next hop. Consequently, forwarding ASICs 90 may apply header information to the network packet that specifies PFE 38D, which includes egress interface 46C. Forwarding ASICs 90 may also apply header information to the network packet such as egress interface identifier 102N that specifies egress interface 46C. Upon applying the header information, PFE 38A forwards the network packet to PFE 38D using switch fabric 50. Upon receiving the network packet, virtual router 12B determines that header information of the network packet specifies egress interface 46C. Using the header information PFE 38D may forward the network packet to another router using egress interface 46C.

As shown in FIG. 4, control module 110 may similarly generate collapsed configuration information based on forwarding information received from virtual router 12A. As shown in FIG. 4, lookup structures 98 include key information 104A, logical interface identifier 106A, and egress interface identifier 106N. In accordance with techniques of the disclosure, control module 110 may associate a logical interface with an egress interface of virtual router 12A. Consequently, when forwarding ASICs 108 perform an ingress lookup and determine a network packet will traverse a network route that includes virtual router 12A based on key information 104A, forwarding ASICs 108 may forward the network packet directly to an egress interface of virtual router 12A that is identified by egress interface identifier 106N. By associating logical interface identifier 106A with egress interface identifier 106N, forwarding ASICs 108 may forward a network packet directly to a logical interface of virtual router 12A.

Figure 5:
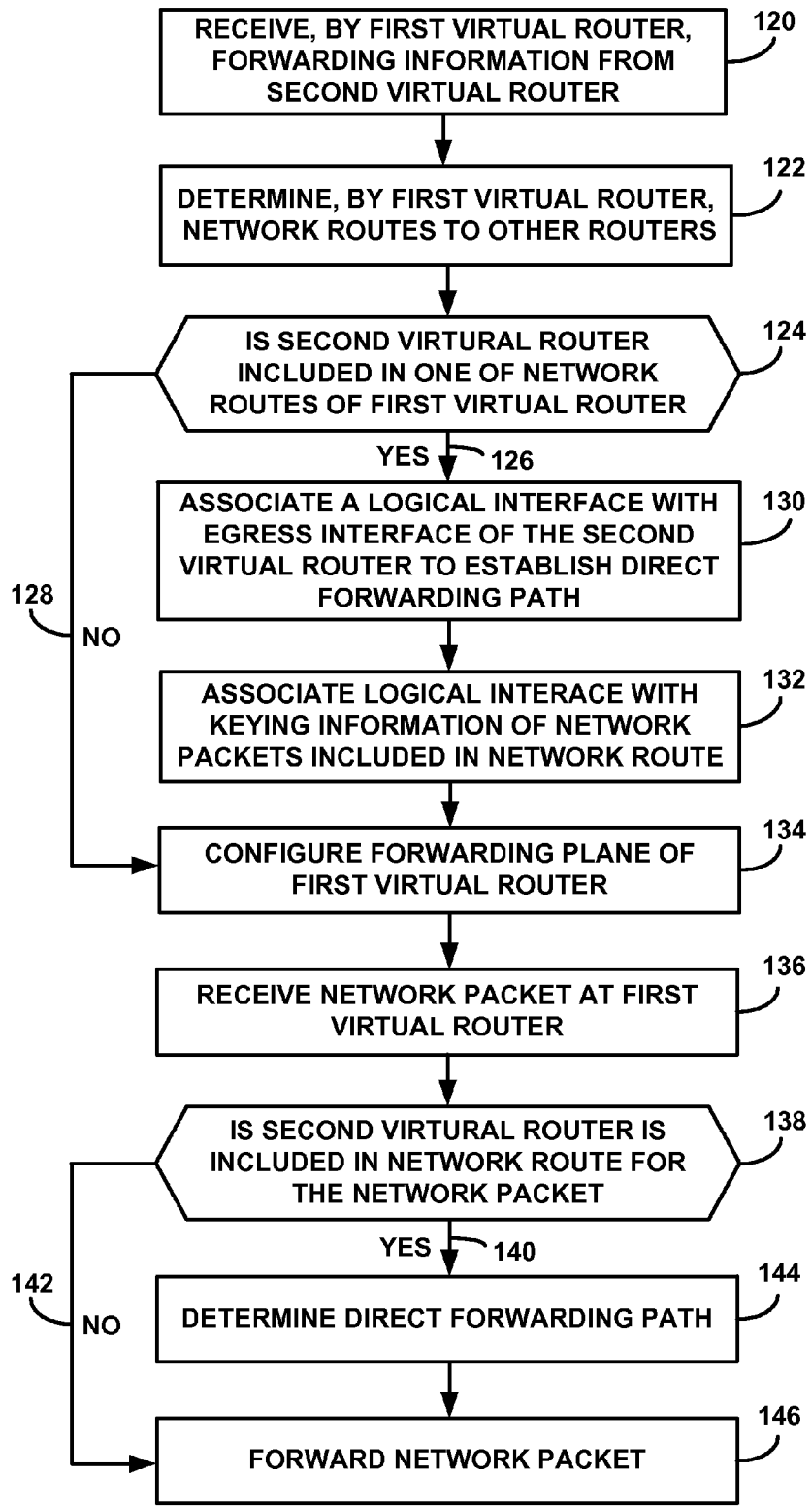
FIG. 5 is a flowchart illustrating example operations to establish a direct forwarding path between virtual routers, in accordance with techniques of this disclosure.

FIG. 5 is a flowchart illustrating example operations to establish a direct forwarding path between virtual routers, in accordance with techniques of this disclosure. The example of operations may be performed by virtual router 12A (e.g., using control module 76) as described in the examples of FIGS. 1-4. Initially, control module 76 requests forwarding information from virtual router 12B using one or more control messages. In response virtual router 12B determines its forwarding information and sends the information to control module 76.

Control module 76 subsequently receives the forwarding information from virtual router 12B (120). Control module 76 determines network routes to other routers, which virtual router 12A may use to route network packets (122). Upon determining the network routes, control module 76 determines whether virtual router 12B is included one of the network routes (124). For instance, virtual router 12B in some examples route network packets received from virtual router 12A on to other network devices. If virtual router 12B is not included in one of the network routes (128), control module 76 may proceed to configure the forwarding plane of virtual router 12A to forward network packets based on forwarding information determined by virtual router 12A (134).

In accordance with techniques of the disclosure, if virtual router 12A determines that virtual router 12B is included in one of the network routes determined by control module 76 (124), control module 76 associates a logical interface with an egress interface of virtual router 12B that is associated with the network route (130). That is, control module 76 generates collapsed forwarding information that establishes a direct forwarding path from virtual router 12A to virtual router 12B. Consequently, network packets may traverse the switch fabric once from the ingress interface of virtual router 12A to the egress interface of virtual router 12B.

Control module 76 further associates the logical interface with keying information of network packets that may traverse the network route that includes virtual router 12B (132). In some examples, control module 76 generates a group of chained next hops to associate the ingress interface of virtual router 12A, the logical interface, and the egress interface of virtual router 12B as described in FIGS. 1-4. Upon generating the group of chained next hops, control module 76 configures the forwarding plane of virtual router 12A in accordance with the collapsed forwarding information that includes the group of chained next hops (134).

When a packet is received at PFE 36A of the forwarding plane of virtual router 12A (as shown in FIG. 1), PFE 36A determines whether the network route for the network packet includes virtual router 12B. For instance, PFE 36A may determine header data of the network packet as keying information, which PFE 36A may to determine one or more next hops. If the keying information does not indicate, for example, an egress interface of virtual router 12B, PFE 36A may not use a direct forwarding path between virtual router 12A and virtual router 12B to route the network packet (142). Instead, PFE 36A may forward the network packet to the next router specified by next hop data associated with the keying information of the packet header (146).

In accordance with techniques of the disclosure, if PFE 36A determines that the network route for the network packet includes virtual router 12B (138), PFE 36A may determine a group of chained next hops that correspond to the direct forwarding path between virtual routers 12A and 12B (144). For instance, PFE 36A may perform a lookup upon receiving the network packet using header information of the network packet to determine the chain of next hops that comprise the direct forwarding path. Upon determining the chain of next hops, PFE 36A processes the network packet using the direct forwarding path such that the network packet is forwarded directly across the switch fabric from the ingress interface of virtual router 12A to the egress interface of virtual router 12B (146). That is, the network packet may traverse the switch fabric once from the ingress interface of virtual router 12A to the egress interface of virtual router 12B. Stated another way, virtual router 12A may not forward the network packet from an egress interface of virtual router 12A to an ingress interface of virtual router 12B.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

The invention claimed is:

1. A method comprising:
    receiving, by a first virtual router, forwarding information from a plurality of virtual routers, wherein the forwarding information indicates at least one filter that is associated with an ingress interface of a second virtual router, wherein the plurality of virtual routers are executed on at least one physical network device;
    combining the forwarding information from the plurality of virtual routers into collapsed forwarding information that comprises one or more direct forwarding paths between the respective virtual routers;
    determining, by the first virtual router and based at least in part on the collapsed forwarding information, a direct forwarding path from the first virtual router to an egress interface of the second virtual router;
    responsive to determining that the at least one filter is associated with the ingress interface of the second virtual router, configuring a forwarding plane of the first virtual router to apply the at least one filter to network packets that are forwarded using the direct forwarding path from the first virtual router to the egress interface of the second virtual router;
    in response to receiving a network packet at an ingress interface of a first virtual router, determining, by the first virtual router, that the network packet is associated with the direct forwarding path from the first virtual router to the egress interface of the second virtual router;
    applying the at least one filter to the network packet; and
    forwarding, by the first virtual router, the network packet to the egress interface of the second virtual router using the direct forwarding path, wherein the network packet traverses a switch fabric of the at least one physical network device directly from the ingress interface of the first virtual router to the egress interface of the second virtual router.

2. The method of claim 1, further comprising:
    requesting, by the first virtual router, forwarding information of the second virtual router, wherein the forwarding information of the second virtual router specifies one or more network routes that are usable by second virtual router to forward network packets; and
    receiving, by the first virtual router, the forwarding information of the second virtual router from the second virtual router.

3. The method of claim 1, wherein combining forwarding information from the plurality of virtual routers into collapsed forwarding information further comprises:
    determining, by the first virtual router, whether the second virtual router is included in a network route from the first virtual router to a network device that is also included in the network route; and
    when the second virtual router is included in the network route, generating, by the first virtual router, the direct forwarding path between the ingress interface of the first virtual router and the egress interface of the second virtual router.

4. The method of claim 3, wherein generating the direct forwarding path between the ingress interface of the first virtual router and the egress interface of the second virtual router comprises:
   determining, by the first virtual router, a logical interface;
   determining that the at least one filter is associated with the ingress interface of the second virtual router;
   generating, by the first virtual router, a group of chained next hops comprising:
      a first chained next hop that indicates the logical interface;
      a second chained next hop that indicates the at least one filter, the second chained next hop being chained subsequent to the first chained next hop;
      a third chained next hop that is chained subsequent to the second chained next hop, wherein the third chained next hop indicates the egress interface of the second virtual router; and
   associating, by the first virtual router, keying information with the group of chained next hops, such that group of chained next hops are addressable based at least in part on the keying information.

5. The method of claim 4, further comprising:
   installing, by the first virtual router, the group of chained next hops into a lookup structure of a forwarding unit, wherein the forwarding unit is allocated to the first virtual router.

6. The method of claim 4, further comprising:
   determining, by the first virtual router, forwarding information of the second virtual router, wherein the forwarding information comprises at least one egress filter of the first virtual router; and
   associating, by the first virtual router, the at least one egress filter of the first virtual router with the logical interface.

7. The method of claim 3, wherein determining the direct forwarding path to the egress interface of the second virtual router further comprises:
   determining, the first virtual router, keying information of the network packet; and
   determining, by the first virtual, the group of chained next hops based at least in part on comparing the keying information of the network packet and the keying information associated with the group of chained next hops.

8. The method of claim 1, wherein the network packet traverses the switch fabric of the least one physical network device once from the ingress interface of the first virtual router to the egress interface of the second virtual router.

9. The method of claim 1, wherein the first virtual router does not forward the network packet from an egress interface of the first virtual router to an ingress interface of the second virtual router.

10. A network device comprising:
   a control unit having one or more hardware-based microprocessors;
   a control module that receives, by a first virtual router of the network device, forwarding information from a plurality of virtual routers, wherein the forwarding information indicates at least one filter that is associated with an ingress interface of a second virtual router, wherein the plurality of virtual routers are executed on the network device
   wherein the control module combines forwarding information from the plurality of virtual routers into collapsed forwarding information that comprises one or more direct forwarding paths between the respective virtual routers;
   wherein the control module determines, based at least in part on the collapsed forwarding information, a direct forwarding path from the first virtual router to an egress interface of the second virtual router;
   wherein the control module responsive to determining that the at least one filter is associated with the ingress interface of the second virtual router, configures a forwarding plane of the first virtual router to apply the at least one filter to network packets that are forwarded using the direct forwarding path from the first virtual router to the egress interface of the second virtual router;
   a forwarding unit that, in response to receiving a network packet at an ingress interface of the first virtual router, determines that the network packet is associated with the direct forwarding path from the first virtual router to the egress interface of the second virtual router;
   wherein the forwarding unit applies the at least one filter to the network packet; and
   wherein the forwarding unit forwards the network packet to the egress interface of the second virtual router using the direct forwarding path, wherein the network packet traverses a switch fabric of the at least one physical network device directly from the ingress interface of the first virtual router to the egress interface of the second virtual router.

11. The network device of claim 10,
   wherein the control module requests forwarding information of the second virtual router, wherein the forwarding information of the second virtual router specifies one or more network routes that are usable by second virtual router to forward network packets; and
   wherein the control module receives the forwarding information of the second virtual router from the second virtual router.

12. The network device of claim 10,
   wherein the control module determines whether the second virtual router is included in a network route from the first virtual router to a network device that is also included in the network route; and
   wherein the control module generates the direct forwarding path between the ingress interface of the first virtual router and the egress interface of the second virtual router, when the second virtual router is included in the network route.

13. The network device of claim 12,
   wherein the control module determines a logical interface;
   wherein the control module determines that the at least one filter is associated with the ingress interface of the second virtual router;
   wherein the control module generates a group of chained next hops comprising:
      a first chained next hop that indicates the logical interface;
      a second chained next hop that indicates the at least one filter, the second chained next hop being chained subsequent to the first chained next hop;
      a third chained next hop that is chained subsequent to the second chained next hop, wherein the third chained next hop indicates the egress interface of the second virtual router; and
   wherein the control module associates keying information with the group of chained next hops, such that group of chained next hops are addressable based at least in part on the keying information.

14. The network device of claim 13,
wherein forwarding unit installing the group of chained next hops into a lookup structure of a forwarding unit, wherein the forwarding unit is allocated to the first virtual router.

15. The network device of claim 13,
wherein the control module determines forwarding information of the second virtual router, wherein the forwarding information comprises at least one egress filter of the first virtual router; and
wherein the control module associates the at least one egress filter of the first virtual router with the logical interface.

16. The network device of claim 12,
wherein the control module determines keying information of the network packet; and
wherein the control module determines the group of chained next hops based at least in part on comparing the keying information of the network packet and the keying information associated with the group of chained next hops.

17. The network device of claim 10,
wherein the network packet traverses the switch fabric of the network device once from the ingress interface of the first virtual router to the egress interface of the second virtual router.

18. The network device of claim 10,
wherein the first virtual router does not forward the network packet from an egress interface of the first virtual router to an ingress interface of the second virtual router.

19. A non-transitory computer-readable medium comprising instructions that, when executed, cause one or more processors of a network device to:

receive, by a first virtual router, forwarding information from a plurality of virtual routers, wherein the forwarding information indicates at least one filter that is associated with an ingress interface of a second virtual router, wherein the plurality of virtual routers are executed on at least one physical network device;

combine the forwarding information from the plurality of virtual routers into collapsed forwarding information that comprises one or more direct forwarding paths between the respective virtual routers;

determine, by the first virtual router and based at least in part on the collapsed forwarding information, a direct forwarding path from the first virtual router to an egress interface of the second virtual router;

responsive to determining that the at least one filter is associated with the ingress interface of the second virtual router, configure a forwarding plane of the first virtual router to apply the at least one filter to network packets that are forwarded using the direct forwarding path from the first virtual router to the egress interface of the second virtual router;

determine, in response to receiving a network packet at an ingress interface of a first virtual router, that the network packet is associated with the direct forwarding path from the first virtual router to the egress interface of the second virtual router;

apply the at least one filter to the network packet; and forward the network packet to the egress interface of the second virtual router using the direct forwarding path, wherein the network packet traverses a switch fabric of the at least one physical network device directly from the ingress interface of the first virtual router to the egress interface of the second virtual router.

\* \* \* \* \*